Sept. 28, 1965        M. P. CALIPPE        3,208,490

PERCUSSION-TYPE NUT-CRACKER

Filed Feb. 19, 1963        2 Sheets-Sheet 1

Sept. 28, 1965
M. P. CALIPPE
3,208,490
PERCUSSION-TYPE NUT-CRACKER
Filed Feb. 19, 1963
2 Sheets-Sheet 2
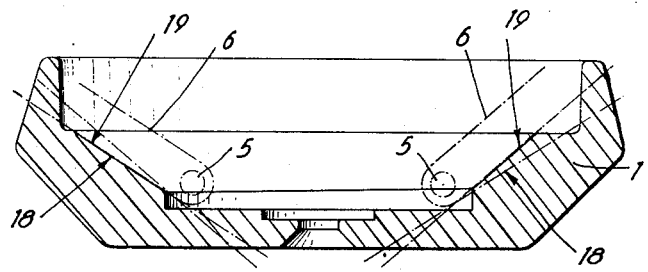
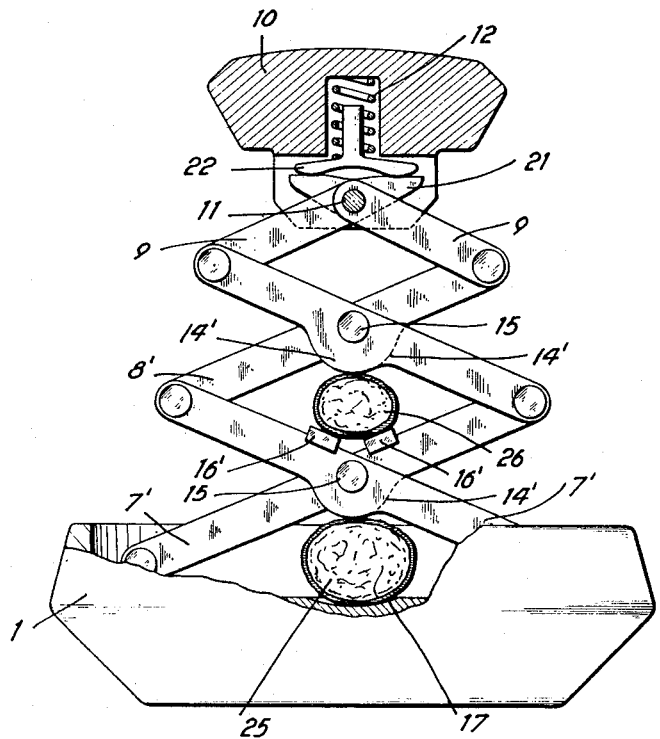

United States Patent Office 3,208,490
Patented Sept. 28, 1965

3,208,490
PERCUSSION-TYPE NUT-CRACKER
Michel Pierre Calippe, 51 Rue de Douai, Paris, France
Filed Feb. 19, 1963, Ser. No. 259,598
Claims priority, application France, Feb. 21, 1962,
888,671, Patent 1,322,942
3 Claims. (Cl. 146—16)

The present invention relates to a nut-cracker of the percussion or thrust type.

The purpose of the invention is to produce a nut-cracker which can be employed for hard-shell fruits having very different sizes in such manner as to open these latter by a limited crushing of the shell, such a crushing treatment being intended to ensure that the fruit remains in a virtually entire state.

The nut-cracker in accordance with the invention comprises in its most general form a base which is intended to rest on a stable support, a push-knob connected to the said base by coupling means which are arranged in such a manner that the said push-knob can be displaced along a rectilineal path which passes substantially through the centre of the said base, and at least one percussion member which is also connected to the said push-knob in such a manner as to move along the said path.

The coupling means which connects to the push-knob to the base are advantageously made up of a system of articulated diamonds and are preferably made up of at least three of these diamonds so as to form a system of effort multiplication of the mechanical advantage.

The base can be constituted by a cup which is advantageously mounted inside a pan designed for the purpose of collecting the fragments of the shell.

The movement of the push-knob is preferably limited by end-of-travel abutments.

In a particular form of embodiment, the combined assembly of push-knob coupling means is mounted for rotation about a shaft which coincides with the path of the push-knob, and the end-of-travel abutment system is constituted by a variable-height cam against which are applied the bottom components of the said coupling means.

Further details and particular features of the invention will be brought out by the following description of examples of construction, reference being made therein to the accompanying drawings, in which:

FIG. 3 is a view taken in axial cross-section of an alternative form of embodiment of the cup, and FIG. 4 is a view taken in elevation, partially broken away, and in partial cross-section, of an alternative form of embodiment of the nut-cracker.

Figure 1:
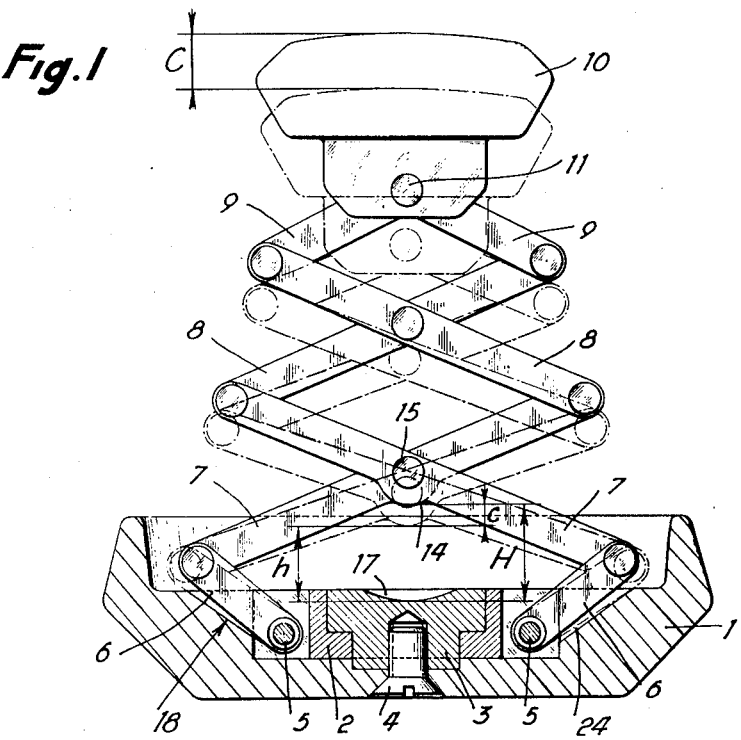
FIG. 1 is a view in axial cross-section of the base and the cup, and a view taken in elevation of the push-knob and of the diamond-lattice articulation mechanism, the right-hand half-view corresponding to the position of the said mechanism when in the extended condition while the left-hand half-view corresponds to the position of the said mechanism when in the compressed condition.
Figure 2:
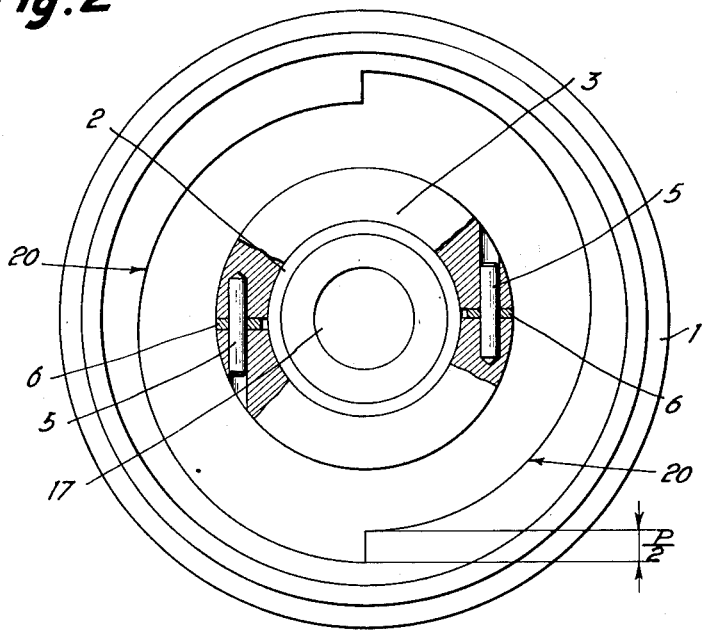
FIG. 2 is a plan view, partially broken away, of the base and of the cup of the nut-cracker of FIG. 1.

In the examples of FIGS. 1 to 3, the nut-cracker comprises a cup or tray 1, at the centre of which is fixed by means of the screw 4, the base or centering-bridge 3. A ferrule 2 is adapted to rotate about the said centering-bridge 3. On the said ferrule 2 are pivotally coupled by means of symmetrically placed pins 5 the flat rods 6 which constitute the first components of the effort-multiplication system. This latter further consists in this example of rods 7, 8 and 9 which are pivotally mounted on the fulcrum pin 11 as well as the push-knob 10. The rods 9 are fitted with extensions 21 on which are brought to bear a yoke 22, the said yoke being thrust downwards by the spring 12 which is applied against the push-knob 10.

The flat rods 7 and 8 are provided with convex portions or bulges such as the bulge 14 which are concentric with the fulcrums 15 and jaws such as the jaw 16 which are placed opposite to the bulges 14.

A hollowed-out portion 17 of suitable size is formed in the centering-bridge 3.

The tray 1 is recessed in such a manner as to form an inclined plane or abutment slope 18. The surface of the said inclined plane 18 is generated by the side 19 of the flat rods 6 which are pivoted at 5, the said side 19 being guided through an angle of 180° by a spiral of Archimedes 20 having a pitch P. The rods 6 will be brought to bear on the said inclined plane 18 at the moment of compression of the effort-multiplication system, at points which vary according to the orientation of the said effort-multiplication system. As a result of the shape of the inclined plane 18, this latter will produce variations in the length of the vertical diagonal lines of the articulated diamonds formed by the rods of the effort-multiplication system, from a minimum value to a maximum value, both values being chosen according to the hard-shell fruits to be shelled.

The operation of the appliance is as follows:

By means of the push-knob 10, the effort-multiplication system is rotated so as to ensure that, when the rods 6 rest on the inclined plane 18, there is obtained a height $h$ between the hollowed-out portion 17 and the convex portions 14, the said height $h$ being smaller by a distance $c$ than the dimension of the hard-shelled fruit to be cracked open. The push-knob 10 is drawn upwards in order to obtain the height H between the convex portion 14 and the hollowed-out portion 17, and the fruit 25 is placed as shown in FIG. 4.

In this position, the rods such as the rod 6 move away from the surface 18 and leave a space 24 which corresponds to the distance of travel $c$.

Accordingly, either a thrust or light impact is then imparted to the push-knob 10 which is thus caused to travel over the distance C, thereby having the effect of breaking the shell of the fruit and bringing the rods 6 into contact with the inclined plane 18.

It is important to note that, irrespective of the violence of the force applied to the hard-shell fruit, this latter can be crushed only by the distance $c$ which has been chosen to permit the fracture of the shell, without damaging the fruit inside this latter.

Furthermore, it can be seen that the effort multiplication ratio is $C/c$.

In the alternative form of FIG. 4, the rods 8' have been provided with bulges 14' and provision has also been made for two jaws 16' on the rods 7'.

This arrangement makes it possible to grip and break hard-shell fruits of small size, for example, between two movable bearing surfaces in view of the fact that, as the movement of compression takes place, the bulges 14' and the jaws 16' moves towards each other.

Many changes and modifications may be "made in the structure herein disclosed and described," and those that fairly come within the scope "of the appended claims are contemplated hereby."

What I claim is:

1. In a nut-cracker of the type comprising a base adapted to be supported by a stable support, a push-knob, coupling means connecting said knob and said base for moving said knob along a rectilinear axial path passing substantially through the centre of said base, and at least one percussion member connected to said knob to be moved along said path with said knob, said coupling means comprising at least one couple of crossed rods of equal lengths pivoted to each other and similarly disposed with reference to said axial path, a couple of upper links of equal lengths pivoted at one of their ends to said push-knob and at their other end to said crossed rods respectively and similarly disposed with reference to said axial path, and a couple of lower links of equal lengths pivoted at one of their ends to said base and at their other end to said crossed rods respectively and similarly disposed with reference to said axial path, and said percussion member being constituted by the lower surfaces of said crossed rods located on said axial path.

2. In a nut-cracker as in claim 1, said support having a lateral inner surface adapted to act as a stop for said lower links and therefore to limit the downward movement of said knob on said path.

3. In a nut-cracker of the type comprising a base adapted to be supported by a stable support, a push-knob, coupling means connecting said knob and said base for moving said knob along a rectilinear axial path passing substantially through the centre of said base, and at least one percussion member connected to said knob to be moved along said path with said knob, said coupling means comprising an upper couple of crossed rods of equal lengths pivoted to each other and similarly disposed with reference to said axial path, a lower couple of crossed rods of equal lengths pivoted to each other and similarly disposed with reference to said axial path, the length of the rods of said lower couple being greater than the length of the rods of said upper couple and the lower ends of said upper couple rods being pivoted to the upper ends of said lower couple rods, a couple of upper links of equal lengths pivoted at one of their ends to said push-knob and at their other end to said upper couple of crossed rods respectively and similarly disposed with reference to said axial path, and a couple of lower links of equal lengths pivoted at one of their ends to said base and at their other end to said lower couple of crossed rods respectively and similarly disposed with reference to said axial path, and said percussion member being constituted by the lower surfaces of said crossed rods located on said axial path.

References Cited by the Examiner

UNITED STATES PATENTS

| | | |
|---|---|---|
| 901,247 | 10/08 | Lyons. |
| 1,094,698 | 4/14 | Bostrom _____ 146—15 |
| 1,210,414 | 1/17 | Burkhardt _____ 146—15 X |
| 2,656,866 | 10/53 | Rumsey _____ 146—15 |

J. SPENCER OVERHOLSER, *Primary Examiner.*